United States Patent
Hüner et al.

(10) Patent No.: US 6,936,341 B2
(45) Date of Patent: Aug. 30, 2005

(54) FIBER-REINFORCED CERAMIC MATERIAL

(75) Inventors: Ronald Hüner, Baar (DE); Moritz Bauer, Augsburg (DE); Peter Winkelmann, Thierhaupten (DE)

(73) Assignee: SGL Carbon AG (DE)

( * ) Notice: Subject to any disclaimer, the term of this patent is extended or adjusted under 35 U.S.C. 154(b) by 0 days.

(21) Appl. No.: 10/799,313

(22) Filed: Mar. 12, 2004

(65) Prior Publication Data

US 2004/0204533 A1 Oct. 14, 2004

(30) Foreign Application Priority Data

Mar. 13, 2003 (DE) .......................................... 103 10 945

(51) Int. Cl.⁷ ............................................... B32B 18/00
(52) U.S. Cl. .................... 428/293.4; 428/372; 428/391; 428/307.7; 428/365; 428/66.2; 428/293.1; 427/228; 427/372.2; 427/383.7; 264/430; 264/319; 264/345; 264/904; 260/998.13
(58) Field of Search ................................ 428/372, 391, 428/307.7, 365, 66.2, 293.1, 206, 293.4, 323, 332, 359, 364; 427/228, 372.2, 383.7; 264/430, 319, 345, 904, 652, 682, 683; 260/998.13; 188/251 R; 139/383; 501/96, 97, 92, 98; 106/287.11

(56) References Cited

U.S. PATENT DOCUMENTS 5,459,114 A * 10/1995 Kaya et al. ................. 501/95.2
6,302,246 B1    10/2001 Näumann et al.
6,418,973 B1 *  7/2002 Cox et al. ................ 139/383 R
2003/0057040 A1  3/2003 Bauer et al.
2003/0138672 A1  7/2003 Bauer et al.

FOREIGN PATENT DOCUMENTS

| DE | 101 57 583 | 12/2002 |
| DE | 101 33 635 | 2/2003 |
| DE | 101 48 659 | 2/2003 |
| EP | 1 013 956 | 6/2000 |
| EP | 1 273 818 | 1/2003 |
| EP | 1 319 640 | 6/2003 |
| EP | 1 386 896 | 2/2004 |

* cited by examiner

*Primary Examiner*—Merrick Dixon
(74) *Attorney, Agent, or Firm*—Connolly Bove Lodge & Hutz LLP

(57) ABSTRACT

Process for a fiber-reinforced ceramic material whose reinforcing fibers are present in the form of at least one of woven fabrics, short fibers and long fibers, wherein the mass ratio of the fibers in the form of woven fabrics, short fibers and long fibers is 0–35:25–80:0–45 and at least a part of the reinforcing fibers has at least one protective layer of carbon produced by pyrolysis of resins or pitches, boron compounds or phosphorus compounds or combinations thereof which have been deposited thereon, a process for producing it and its use as material for brake linings

12 Claims, No Drawings

FIBER-REINFORCED CERAMIC MATERIAL

FIELD OF THE INVENTION

The invention relates to fiber-reinforced ceramic materials which are suitable as material for brake linings in combination with brake discs having ceramic friction layers.

BACKGROUND OF THE INVENTION

Organically bound brake linings which are used in combination with cast iron brake discs are generally not suitable in combination with brake discs having ceramic linings because of the higher temperatures encountered during braking.

A friction pairing in which the same material is used for the linings and for the friction layer of the brake disc has the disadvantage that, as a result, the disc wears to the same extent as the linings; this rules out use of the brake disc over the entire operating time of the unit in which it is present.

From EP-A 1 013 956 a brake unit has been known in which a brake disc comprising a metal-ceramic composite whose friction surface has to have a Vickers hardness (HV 0.5) of from 1 600 to 2 500 is combined with a friction lining having a coefficient of friction of from 0.3 to 0.5 and the fastening element and the brake disc hub have to be made of stainless, non-corroding material.

In view of this prior art, it is an object of the invention to provide materials for brake linings which have a higher wear resistance even at elevated temperature and do not have an adverse effect on the wear behavior of the brake disc combined therewith. The material of the brake linings should display greater wear than the friction layer of the disc during operation, and the composition (matrix, reinforcing fibers) should be variable and be able to be matched in a simple manner to the intended application.

SUMMARY OF THE INVENTION

This object is achieved by a fiber-reinforced ceramic material whose reinforcing fibers are present in the form of at least one of woven fabrics, short fibers and long fibers, with the mass ratio of the fibers in the form of woven fabrics, short fibers and long fibers being 0–35:25–80:0–45, preferably 2–30:30–75:5–40. At least a part of the reinforcing fibers, preferably at least 10% of the mass of the reinforcing fibers, particularly preferably at least 25% and in particular at least 50%, has at least one protective layer of carbon produced by pyrolysis of resins or pitches, boron compounds or phosphorus compounds or combinations thereof which have been deposited on the fibers. The reinforcing fibers are in particular carbon fibers, preferably carbon fibers having at least one protective layer of carbon produced by pyrolysis of resins or pitches, boron compounds or phosphorus compounds, compounds comprising boron and phosphorus and, if desired, third elements or combinations thereof which have been deposited on the fibers. Such coated carbon fibers will hereinafter be referred to as "conditioned fibers". It is further preferred that the short fibers used are at least 50% conditioned fibers. It is likewise preferred that at least 50% of the long fibers are conditioned fibers, with the proportion in each case being the mass fraction. However, it is also possible to use silicon carbide fibers, silicon carbonitride fibers and also fibers made of compounds of silicon, boron, carbon and nitrogen in any ratios, and these can likewise be coated.

The term "short fibers" refers to fibers having a length of up to 5 mm, while long fibers are fibers whose length is at least 5.1 mm, preferably at least 6 mm and in particular at least 7.5 mm.

DETAILED DESCRIPTION OF THE PREFERRED EMBODIMENTS

In the case of CFC materials ("carbon fiber reinforced carbon", CFRC), the matrix of the materials of the invention comprises carbon or preferably a carbidic ceramic, particularly preferably silicon carbide, in admixture with unreacted carbon and silicon. The matrix can further comprise inorganic polymers such as polysilazanes and substituted polysilazanes whose substituents are preferably boron and/or phosphorus.

In the case of silicon carbide ceramics, the matrix preferably comprises from 20 to 99.8% by mass of SiC, from 0.1 to 40% by mass of silicon and from 0.1 to 70% by mass of carbon. Particular preference is given to from 25 to 80% by mass of SiC, from 5 to 25% by mass of Si and from 5 to 65% by mass of C being present. Further constituents can be $SiO_2$ (1 to 20%), lamellar boron nitride (0.5 to 20%), manganese sulfide (0.5 to 20%) and metal silicides (0.5 to 20%). The materials mentioned are preferably used in such amounts that the specified mass fractions add up to 100%.

The mass ratio of reinforcing fibers to matrix in the materials of the invention is 5–50:95–50, preferably 10–45:90–55, in particular 20–40:80–60.

The invention also provides a process for producing the ceramic composites, which comprises shaping a molding composition comprising reinforcing fibers and carbonizable materials selected from among thermoset and thermoplastic polymers, resins and pitches and, if desired, woven fabrics of reinforcing fibers to produce shaped bodies (green bodies). This shaping is preferably carried out by pressing. Preference is given to molding compositions comprising reinforcing fibers in the form of short fibers, long fibers or a mixture thereof and, if desired, woven fabrics, where the proportion by mass of these reinforcing fibers in the molding composition is from 5 to 50%.

The term "carbonizable" refers to materials which form carbon on heating to a temperature of from about 750 to about 1 100° C. in the absence of oxygen, with the mass of the carbon formed being at least 10% of the mass of the initial material.

The green bodies are subsequently fired at the temperatures indicated to produce porous, fiber-reinforced carbon bodies which can be used directly as materials for brake linings. In a preferred embodiment, the porous carbon bodies are infiltrated with liquid silicon or a silicon-containing alloy at a temperature which is at least as high as the melting temperature of silicon, resulting in at least a part of the carbon being converted into silicon carbide. Suitable silicon-containing alloys are, in particular, ferrosilicon, alloys of silicon with other metals of the iron group and alloys with either of chromium, molybdenum, titanium, vanadium, aluminum and magnesium.

The woven fabrics are oriented in the materials of the invention so that their plane is preferably parallel to the friction layer which is used in combination with the lining. Preference is given to at least 20% of the area of the woven fabrics being aligned so that their plane is parallel to the friction layers. The ceramic composites used for the brake linings are preferably provided with an oxidation protection, i.e. they are impregnated with an aqueous solution of a salt or a mixture of salts which form(s) a glass at elevated temperature prior to the last thermal treatment (firing to give the porous carbon body or infiltration with molten silicon or a silicon-containing alloy). Preference is given to using phosphates, silicates, aluminates and/or borates of alkali metals, alkaline earth metals or earth metals for this purpose.

In another preferred embodiment, the ceramic composites are infiltrated with metals, after firing to produce porous carbon bodies or after infiltration with molten silicon or a silicon-containing alloy, preferably leaving a mass fraction of at least 1%, based on the mass of the composites, as unreacted metal which can, on thermal stressing of the lining material, together with other constituents of the composite react with atmospheric oxygen to form oxides or mixed oxides and can thus suppress oxidative attack on other constituents of the composite. Preferred metals for this purpose are copper, silver, aluminum, titanium and the elements of the iron group.

If composites are produced according to these preferred methods, their matrix contains a mass fraction of from 0.1 to 25% of a glass phase formed from the salt or a mass fraction of from 0.1 to 20% of the metals introduced by infiltration.

It has surprisingly been found that the conditioning of the reinforcing fibers used, in particular of the carbon fibers, results in a pseudoductile friction body of fiber-reinforced ceramic which can be matched mechanically in a far better way to the other element of the friction pairing (here, the friction disc which is tribologically paired with the lining) and forms a contact area rather than only contact points. The increased contact area results in an increased coefficient of friction of the tribological pairing, and wear caused by abrasion and tribooxidation is appreciably reduced. The formation of "hot spots" as in the case of predominantly pointwise contact is no longer observed.

Friction linings are made by fixing this fiber-reinforced ceramic material in the form of plates to support plates, which are generally made of metals such as iron or steel.

EXAMPLES

The invention is illustrated by the following examples.

Example 1

A mixture of mass fractions of 40% of conditioned carbon fibers of which half was present in the form of short fibers having a mean length of 3 mm and a diameter of from 8 to 10 μm and half was present in the form of long fibers having a mean length of 50 mm and a mean diameter of from 8 to 10 μm, 20% of petroleum coke having a mean particle diameter of not more than 45 μm, 30% of a phenolic resin composition (novolak, ®Bakelite SP 222, having a B time in accordance with DIN ISO 8987 A at 150° C. of 120 s and containing a mass fraction of 9% of hexamethylenetetramine), 1% of manganese sulfide, 0.5% of lamellar boron nitride powder having a mean particle size of not more than 45 μm, 1.5% of natural graphite (Graphitbergbau Kaiserberg, particle size below 45 μm) and 7% of pitch (®Carbores, Rütgers, black coal tar pitch having a high carbon yield, softening temperature above 220° C.) was mixed intimately in a mixer, this mixture was pressed by means of a hydraulic press to a thickness of 20 mm and was then heated at 700° C. for five hours in the absence of air in a furnace. The resulting plates were machined to the desired final shape, applied to support plates of ceramic and metal and ground parallel to the bottom plane of the support.

Example 2

A mixture of 45% of conditioned carbon fibers of which half was present in the form of short fibers having a mean length of 4 mm and a diameter of from 8 to 10 μm and half was present in the form of long fibers having a mean length of 50 mm and a mean diameter of from 8 to 10 μm, 10% of petroleum coke having a mean particle diameter of not more than 45 μm, 35% of a phenolic resin composition (novolak, ®Bakelite SP 222, as above), 1% of silicon carbide powder having a particle size of less than 45 μm, 0.5% of lamellar boron nitride powder having a particle size of not more than 45 μm, 3.5% of graphite powder (Graphitbergbau Kaiserberg, having a particle size of less than 45 μm) and 5% of pitch (®Carbores, Rütgers, as above) was mixed intimately in a mixer, this mixture was pressed by means of a hydraulic press to form plates having a thickness of 20 mm and was then heated at 700° C. for five hours in the absence of air in a furnace. The resulting plates were machined to the desired final shape and subjected to a siliconisation reaction with liquid silicon, resulting in part of the carbon being converted into SiC. The plates were firstly ground on one side and applied to support plates of ceramic and metal with the machined side facing the support plate and the free surface was ground parallel to the bottom plane of the support.

Example 3

A mixture of 25% of conditioned carbon fibers of which half was present in the form of short fibers having a mean length of 4 mm and a diameter of from 8 to 10 μm and half was in the form of long fibers having a mean length of 50 mm and a mean diameter of from 8 to 10 μm, 5% of a woven fabric of conditioned carbon fibers having a diameter of from about 8 μm to about 10 μm, 30% of petroleum coke (as in example 1), 35% of a phenolic resin composition (as in example 1) 1% of silicon carbide powder (as in example 2) and 4% of pitch (as in example 1) was intimately mixed in a mixer, this mixture was pressed by means of a hydraulic press to form plates having a thickness of 20 mm and was then heated at 700° C. for five hours in a furnace in the absence of air. The resulting plates were first ground on one side and fixed to support plates of ceramic and metal with the machined side facing the support plate and the free surface was then ground parallel to the bottom plane of the support. The plates obtained were machined to the desired final shape and subjected to infiltration with a precursor polymer of the formula a), with infiltration taking place at temperatures of from about 60° C. to about 80° C. under reduced pressure (about 10 hPa). During subsequent heating to 1 000° C., the polymer is transformed into an amorphous ceramic. The plates were then ground on one surface and fixed to support plates of ceramic and metal with the ground surface facing the support plate, and the unmachined surface was subsequently ground parallel to the bottom of the support.

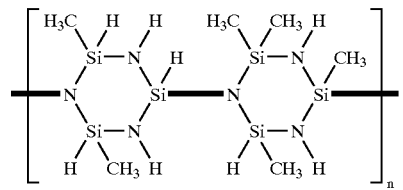

Formula a)

Example 4

A mixture of 45% of conditioned carbon fibers of which half was present in the form of short fibers having a mean length of 4 mm and a diameter of from 8 to 10 μm and half was present in the form of long fibers having a mean length of 50 mm and a mean diameter of from 8 to 10 μm, 10% of petroleum coke having a mean particle diameter of not more than 45 µm, 35% of a phenolic resin composition (novolak, ®Bakelite SP 222, as above), 1% of silicon carbide powder having a particle size of less than 45 µm, 0.5% of lamellar boron nitride powder having a mean particle size of not more than 45 µm, 3.5% of graphite powder (Graphitbergbau Kaiserberg, having a particle size of less than 45 µm) and 5% of pitch (®Carbores, Rütgers, as above) was mixed intimately in a mixer, this mixture was pressed by means of a hydraulic press to form plates having a thickness of 20 mm and was then heated at 700° C. for five hours in a furnace in the absence of air. The resulting plates were machined to the desired final shape and subjected to a siliconisation reaction with liquid silicon, resulting in part of the carbon being converted into SiC. The plates were first ground on one side and applied to support plates of ceramic and metal with the machined side facing the support plate and the free surface was ground parallel to the bottom plane of the support.

What is claimed is:

1. Brake linings made from a fiber-reinforced ceramic material whose reinforcing fibers are present in the form selected from the group consisting of woven fabrics, short fibers and long fibers, wherein the mass ratio of the fibers in the form of woven fabrics, short fibers and long fibers is 0–35:25–80:5–40 and at least a part of the reinforcing fibers has at least one protective layer of carbon produced by pyrolysis of a material selected from the group consisting of resins, pitches, boron compounds, and phosphorus compounds which materials have been deposited on the fibers.

2. The fiber-reinforced ceramic material as claimed in claim 1, wherein at least 50% of the mass of the fibers are carbon fibers.

3. The fiber-reinforced ceramic material as claimed in claim 1, wherein the matrix comprises carbon.

4. The fiber-reinforced ceramic material as claimed in claim 1, wherein the matrix comprises silicon carbide.

5. The fiber-reinforced ceramic material as claimed in claim 4, wherein the matrix comprises from 20 to 99.8% by mass of SiC, from 0.1 to 40% by mass of silicon and from 0.1 to 70% by mass of carbon.

6. The fiber-reinforced ceramic material as claimed in claim 2, wherein the carbon fibers have at least one protective layer of carbon produced by pyrolysis of resins or pitches which have been deposited on the said fibers.

7. The fiber-reinforced ceramic material as claimed in claim 1, wherein additives selected from the group consisting of $SiO_2$, silicon carbide powder, lamellar boron nitride, manganese sulfide and metal silicides are present in the matrix.

8. The fiber-reinforced ceramic material as claimed in claim 1, wherein the matrix comprises a glass based on phosphates, silicates, aluminates and/or borates of alkali metals, alkaline earth metals or earth metals.

9. The fiber-reinforced ceramic material as claimed in claim 1, wherein the matrix comprises metals selected from the group consisting of copper, silver, aluminum, titanium and the elements of the iron group.

10. A process for producing fiber-reinforced ceramic materials which comprises shaping by pressing woven fabrics of reinforcing fibers together with a molding composition comprising reinforcing fibers in the form of at least one of short and long fibers and carbonizable materials selected from the group consisting of thermoplastic polymers, resins and pitches to produce shaped bodies which are fired by heating to a temperature of from about 750 to about 1 100° C. in the absence of oxygen to produce porous fiber-reinforced carbon bodies wherein the mass ratio of the fibers in the form of woven fabrics, short fibers and long fibers is 2 35:25 80–45 0–32:25–80:5–40 and at least a part of the reinforcing fibers has at least one protective layer of carbon produced by pyrolysis of a material selected from the group consisting of resins, pitches, boron compounds, and phosphorus compounds which materials have been deposited on the fibers.

11. A method of use of the brake linings as claimed in claim 1 comprising fixing plates made from the brake linings of claim 1 to support plates.

12. The process of claim 10 which additionally comprises infiltrating the porous fiber-reinforced carbon bodies with liquid silicon or a silicon-containing alloy at a temperature which is at least as high the melting point of silicon, resulting in at least a part of the carbon being converted into silicon carbide.

* * * * *